United States Patent
Kobayashi

(10) Patent No.: US 11,204,523 B2
(45) Date of Patent: Dec. 21, 2021

(54) DISPLAY DEVICE AND SURFACE LIGHT SOURCE

(71) Applicant: Funai Electric Co., Ltd., Osaka (JP)

(72) Inventor: Tomohiro Kobayashi, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 17/179,550

(22) Filed: Feb. 19, 2021

(65) Prior Publication Data
US 2021/0271136 A1 Sep. 2, 2021

(30) Foreign Application Priority Data
Mar. 2, 2020 (JP) .............................. JP2020-034964

(51) Int. Cl.
*G02F 1/13357* (2006.01)
(52) U.S. Cl.
CPC .. *G02F 1/133606* (2013.01); *G02F 1/133605* (2013.01); *G02F 1/133608* (2013.01)
(58) Field of Classification Search
CPC ......... G02F 1/133606; G02F 1/133605; G02F 1/133608
USPC .................................................... 349/61–71
See application file for complete search history.

(56) References Cited

U.S. PATENT DOCUMENTS

| 2017/0139101 A1* | 5/2017 | Lee ..................... G02B 6/0055 |
| 2018/0239195 A1* | 8/2018 | Kumamoto ............... F21S 2/00 |
| 2019/0129250 A1* | 5/2019 | Park ..................... G02F 1/1336 |
| 2019/0302461 A1* | 10/2019 | Kanbayashi ........... G02B 5/045 |

FOREIGN PATENT DOCUMENTS

WO 2017/038082 A1 3/2017

OTHER PUBLICATIONS

The extended European search report for the corresponding European application No. 21159004.7, dated Jul. 21, 2021.

* cited by examiner

*Primary Examiner* — Charles S Chang
(74) *Attorney, Agent, or Firm* — Global IP Counselors, LLP

(57) ABSTRACT

A display device includes a display panel, at least one light source, a diffusion plate, an optical member, and a plurality of adhesive layers. The diffusion plate diffuses light from the at least one light source. The optical member is disposed between the diffusion plate and the at least one light source and has at least one transmitting portion that transmits the light from the at least one light source and a reflective portion that reflects the light from the at least one light source. The adhesive layers bond the optical member and the diffusion plate with an air layer therebetween. The adhesive layers are arranged spaced apart from each other in a direction in which the optical member extends. The air layer has the same thickness as the adhesive layers and is located between an adjacent pair of the adhesive layers.

19 Claims, 8 Drawing Sheets

DISPLAY DEVICE AND SURFACE LIGHT SOURCE

CROSS-REFERENCE TO RELATED APPLICATIONS

This application claims priority to Japanese Patent Application No. 2020-034964 filed on Mar. 2, 2020. The entire disclosure of Japanese Patent Application No. 2020-034964 is hereby incorporated herein by reference.

BACKGROUND

Field of the Invention

This invention generally relates to a display device and a surface light source device. More specifically, the present invention relates to a display device and a surface light source device equipped with an optical member and a diffusion plate.

Background Information

Generally, a display device is equipped with an optical member and a diffusion plate (see International Publication No. WO 2017/038082 (Patent Literature 1), for example).

Patent Literature 1 above discloses a display device including a light source substrate with a plurality of light sources, an optical member, a support member, and a diffusion plate. The light sources emit light. The optical member homogenizes a luminance distribution of the light emitted from the light source substrate. The support member is provided between the light source substrate and the optical member and supports the optical member. In Patent Literature 1, the optical member is in the form of a sheet and has holes for adjusting the transmittance of the light. The support member is inserted into a hole in the optical member to support the optical member.

SUMMARY

In the case where an optical member is in the form of a sheet, as in Patent Literature 1 above, the optical member tends to deflect, and therefore a plurality of support members need to be arranged. However, if there are many support members in place, the light path can be blocked by the support members, which reduces the light transmission.

It has been discovered, in order to reduce the number of the support members and suppress the deflection of the optical member, to apply an adhesive to the entire surface of the optical member or the diffusion plate and integrate the diffusion plate and the optical member by overlapping and bonding the optical member to the diffusion plate. However, with this configuration, because the adhesive has a greater refractive index than the air, the light can be refracted at the interface between the adhesive and the air. As a result, the refraction can change the direction of the path of the light and the light diffusion range can become narrower than that of the air layer, which can reduce the diffusion effect of the optical member that is provided for making the luminance distribution of the irradiated light uniform.

One object is to provide a display device and a surface light source device that can suppress deflection of an optical member and improve the diffusion effect of light while reducing the number of support members.

In view of the state of the known technology and in accordance with a first aspect of the present invention, a display device comprises a display panel, at least one light source, a diffusion plate, an optical member, and a plurality of adhesive layers. The diffusion plate is disposed opposite the at least one light source and has an emission surface that faces away from the at least one light source. The diffusion plate diffuses light from the at least one light source to emit the light from the at least one light source from the emission surface. The optical member is disposed between the diffusion plate and the at least one light source and has at least one transmitting portion that transmits the light from the at least one light source and a reflective portion that reflects the light from the at least one light source. The adhesive layers bond the optical member and the diffusion plate with an air layer therebetween. The adhesive layers are arranged spaced apart from each other in a direction in which the optical member extends. The air layer has the same thickness as the adhesive layers and is located between an adjacent pair of the adhesive layers.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment (Configuration of Liquid Crystal Television Device)

Referring to FIGS. 1 to 8, a configuration of a liquid crystal television device 100 according to a first embodiment will be described. The liquid crystal television device 100 is an example of a "display device" of the present disclosure.

Figure 1:
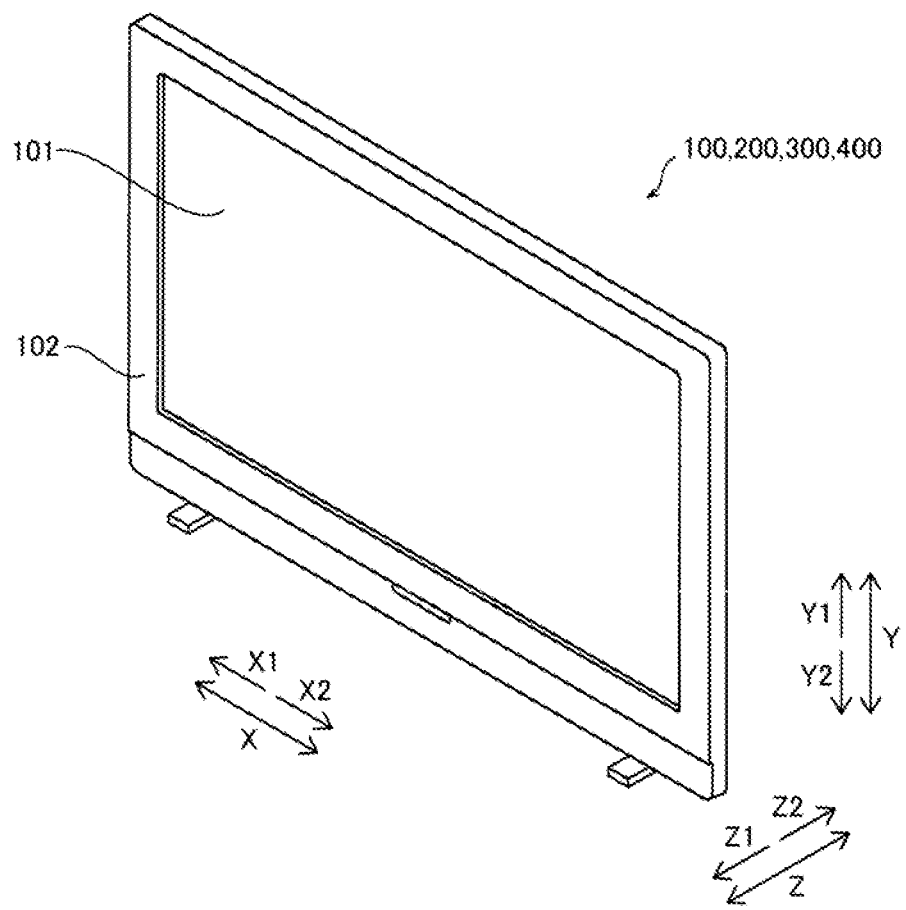
FIG. 1 is a perspective view illustrating an overall configuration of a liquid crystal television device according to a first embodiment.
Figure 2:
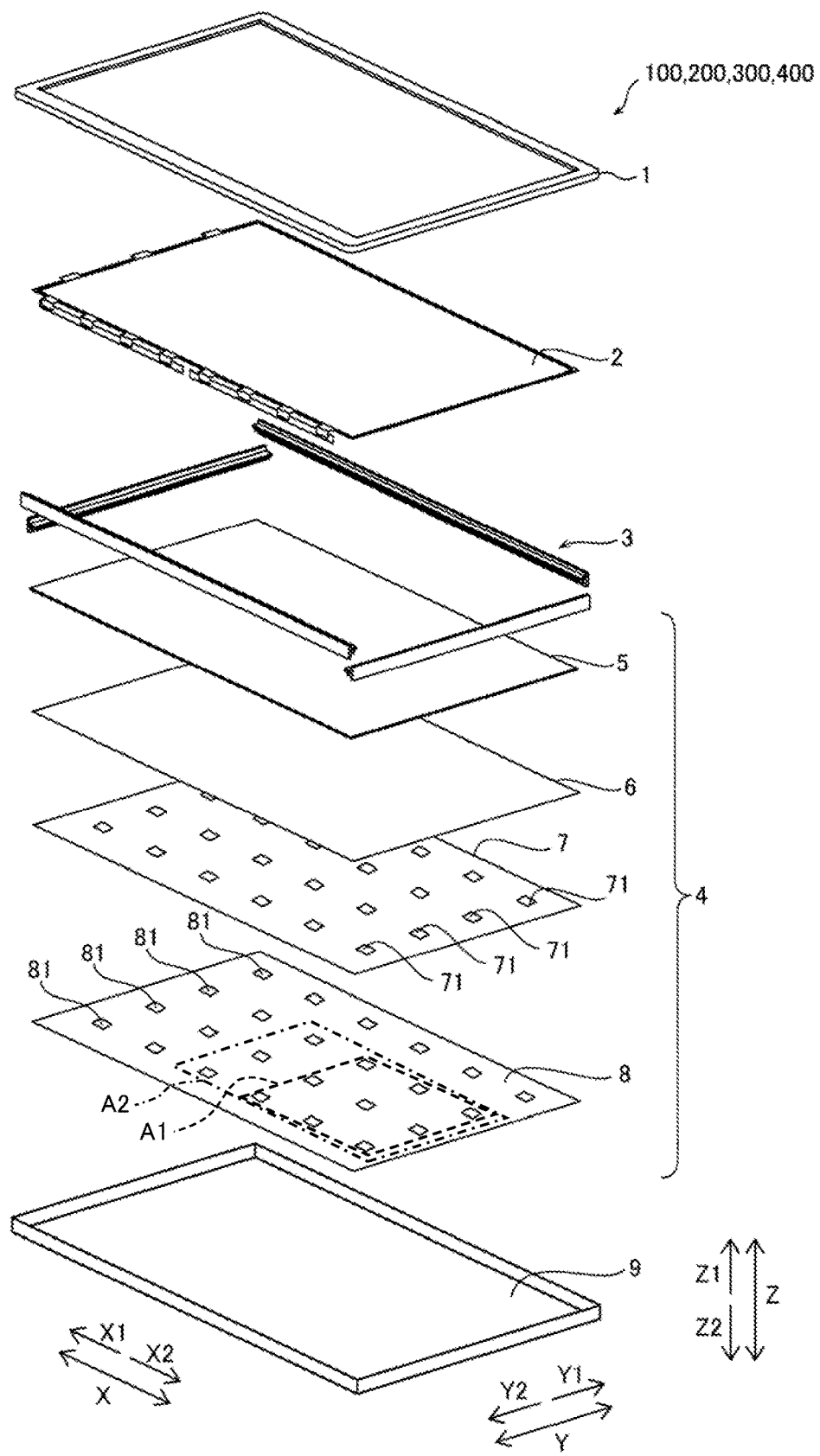
FIG. 2 is an exploded perspective view of the liquid crystal television device according to the first embodiment.

The liquid crystal television device 100 has a display section 101 and a housing 102, as shown in FIG. 1. As shown in FIG. 2, the liquid crystal television device 100 has a front housing 1, a display panel 2, an intermediate frame 3, a backlight 4, and a rear housing 9. The backlight 4 has a diffusion plate 5, an optical member 6, a reflective sheet 7, and a substrate 8. A plurality of light sources 81 are provided on the substrate 8. The backlight 4 is an example of the "surface light source device" of the present disclosure.

The front housing 1 is formed of a resin. The front housing 1 is configured to support the display panel 2 from the front side (Z1 direction side). A rectangular-shaped opening is provided in the center of the front housing 1 to expose the display surface of the display panel 2 to the front side (Z1 direction side).

The display panel 2 includes a liquid crystal cell. The display panel 2 includes a plurality of pixels, and by each of the pixels, images or videos are displayed by changing the transmittance of the light emitted from the light sources 81. The display panel 2 is driven based on video signals.

The intermediate frame 3 is configured to support the display panel 2 from the lateral side (X1 direction side and X2 direction side) and the vertical direction (Y1 direction side and Y2 direction side).

The backlight 4 is disposed on the back side (Z2 direction side) of the display panel 2. The backlight 4 is configured to illuminate the display panel 2 with light from the back side of the display panel 2.

The diffusion plate 5 has a front or emission surface that faces away from the light sources 81 and a back surface that faces toward the light sources 81. Thus, the emission surface of the diffusion plate 5 is disposed on the opposite side (Z1 direction side) of the light sources 81. The diffusion plate 5 diffuses the light from the light sources 81 and emits the light from the emission surface. The diffusion plate 5 is formed in the form of an overall rectangular plate. The diffusion plate 5 is disposed between the display panel 2 and the light sources 81 in a direction (Z direction) perpendicular to the display surface of the display panel 2. The diffusion plate 5 is disposed opposite the light sources 81 in the Z direction. The diffusion plate 5 is disposed at a position on the Z2 side of the display panel 2 so as to face the back surface of the display panel 2 in the Z direction. The diffusion plate 5 is disposed so as to be sandwiched between the rear housing 9 and the intermediate frame 3 which supports the display panel 2.

The diffusion plate 5 is formed of a resin. The diffusion plate 5 is formed, for example, of polycarbonate. The diffusion plate 5 has a thickness (Z direction thickness) of a few millimeters (1 mm or more and 5 mm or less) measured in the Z direction. The diffusion plate 5 has a greater thickness than the optical member 6. This makes the diffusion plate 5 less likely to deflect than the optical member 6.

Figure 3:
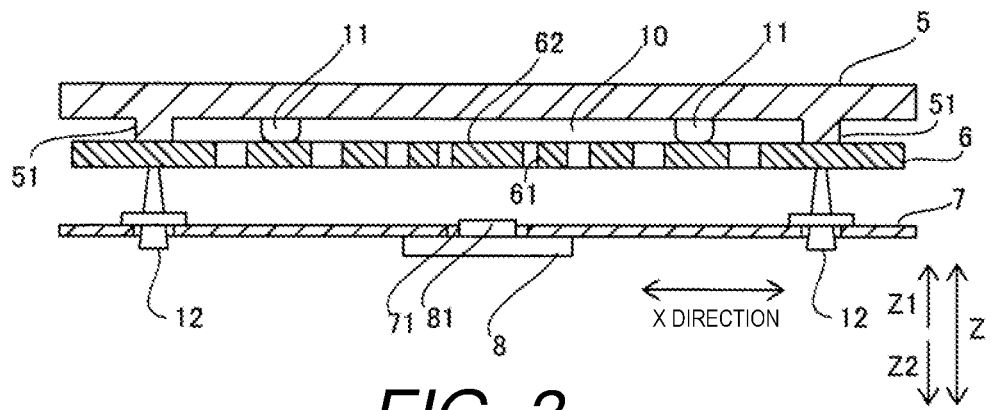
FIG. 3 is a diagram illustrating an example of an arrangement of adhesive layers and support members according to the first embodiment.

As shown in FIG. 3, the diffusion plate 5 includes a plurality of first protruding portions 51 that protrude toward the optical member 6 from the back surface of the diffusion plate 5. Specifically, the first protruding portions 51 are disposed on the optical member 6 side of the diffusion plate 5. The first protruding portions 51 are columnar in shape. The diffusion plate 5 with the first protruding portions 51 is integrally formed as a one-piece, unitary member. The first protruding portions 51 each protrude relative to the back surface of the diffusion plate by a protrusion amount (Z direction thickness) that is equal to the thickness of an air layer 10 formed between the diffusion plate 5 and the optical member 6. A plurality of adhesive layers 11 are provided between the diffusion plate 5 and the optical member 6. The adhesive layers 11 have a thickness that is equal to the thickness of the air layer 10. The Z2 side surfaces of the first protruding portions 51 and a reflective portion 62 of the optical member 6 contact with each other.

As shown in FIGS. 2 and 3, the optical member 6 is disposed between the diffusion plate 5 and the light sources 81. FIG. 3 shows a cross section taken along the X direction, but the same is true for the cross section taken along the Y direction. The optical member 6 includes a plurality of transmitting portions 61 and the reflective portion 62. The transmitting portions 61 transmit the light emitted from the light sources 81. The reflective portion 62 is a remainder portion of the transmitting portions 61. The reflective portion 62 reflects the light emitted from the light sources 81. The optical member 6 is formed in the form of a sheet as a sheet-like member, as shown in FIG. 2. Therefore, the optical member 6 tends to deflect more than the diffusion plate 5. The optical member 6 is disposed backward of the diffusion plate 5. Specifically, the optical member 6 is disposed at a position on the Z2 direction side of the diffusion plate 5 so as to face the back surface of the diffusion plate 5 in the Z direction. The periphery of the optical member 6 is disposed so as to be sandwiched between the rear housing 9 and the intermediate frame 3 which supports the display panel 2.

The optical member 6 is formed of a resin. The optical member 6 is formed, for example, of a micro-cellular foam resin. The optical member 6 is formed, for example, of micro-cellular foam polyethylene terephthalate. The optical member 6 has a thickness of 0.5 mm or more and 1 mm or less in the Z direction (Z direction thickness). The optical member 6 has a smaller thickness than the diffusion plate 5.

Figure 4:
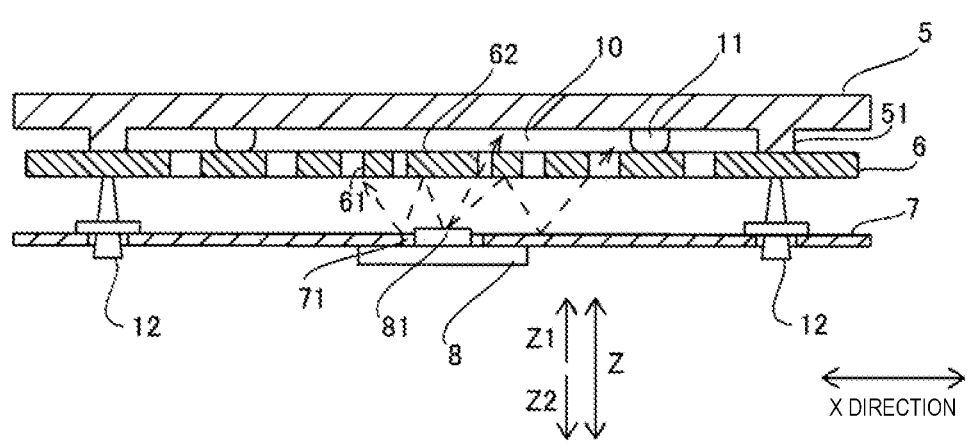
FIG. 4 is a diagram illustrating a light path of light emitted from a light source according to the first embodiment.

As shown in FIGS. 3 and 4, the transmitting portions 61 of the optical member 6 each includes a through hole that penetrates the optical member 6 in the thickness direction (Z direction). The transmitting portions 61 are arranged in predetermined patterns corresponding to positional relationship relative to the light sources 81. The reflective portion 62 of the optical member 6 is a portion of the optical member 6 other than where the through holes are arranged. The reflective portion 62 is configured reflect most of the incident light. FIGS. 3 and 4 show cross sections taken along the X direction, but the same is true for the cross sections taken along the Y direction.

Figure 5:
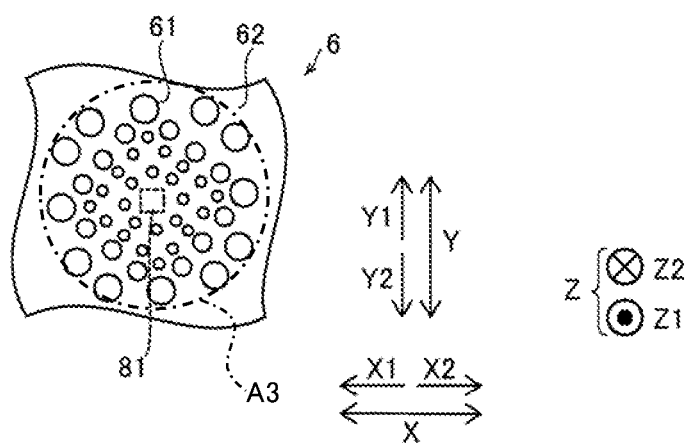
FIG. 5 is a diagram illustrating an example of an arrangement of transmitting portions according to the first embodiment.

As shown in FIG. 5, the optical member 6 is configured to make the light transmitted forward (Z1 direction) have a uniform light intensity in the surface direction (XY direction) by adjusting the transmission amount of light at the transmitting portions 61. In the first embodiment, the transmitting portions 61 of the optical member 6 become larger in area as moving away from each of the light sources 81 in the X or Y direction. On the other hand, in the positions of the optical member 6 opposite the light sources 81 in the Z direction (the positions directly above the light sources 81), the transmitting portions 61 become small or no transmitting portions 61 is provided (i.e., the reflective portion 62 is provided). This makes the luminance distribution uniform by reducing the transmission amount of light that reaches a region that is close to each of the light sources 81 and tends to become brighter than other regions, and by increasing the transmission amount of light that reaches a region that is farther from each of the light sources 81 and tends to become darker than other regions. FIG. 5 shows the arrangement of the transmitting portions 61 for one light source 81.

More specifically, as shown in FIG. 5, a group of the transmitting portions 61 (i.e., the through holes) in various sizes are arranged to form a predetermined pattern of the transmitting portions 61 for each of the light sources 81. In the illustrated embodiment, as shown in FIG. 5, the transmitting portions 61 (i.e., the through holes) are circumferentially arranged along concentric circles that are concentric with respect to each of the light sources 81 and have different radiuses. In the illustrated embodiment, as shown in FIG. 5, the diameters of the transmitting portions 61 become larger as moving away from each of the light sources 81 (i.e., as moving outward in the predetermined pattern), while the diameters of the transmitting portions 61 become smaller as moving toward each of the light source 81 (i.e., as moving inward in the predetermined pattern). Thus, in the illustrated embodiment, in a predetermined region A3 that encircles the predetermined pattern shown in FIG. 5, the optical member 6 has a local transmittance distribution that cancels out a local luminance distribution due to each of the light sources 81. Specifically, in the illustrated embodiment, the aperture ratio or transmittance of the optical member 6 becomes larger as moving away from each of the light sources 81 in the predetermined region A3 (i.e., as moving outward in the predetermined region A3), while the aperture ratio or transmittance of the optical member 6 becomes smaller as moving toward each of the light sources 81 in the predetermined region A3 (i.e., as moving inward in the predetermined region A3). Furthermore, in the illustrated embodiment, the predetermined pattern of the transmitting portions 61 is provided for each of the light sources 81. Thus, the optical member 6 has a global transmittance distribution that is produced by the plurality of the predetermined patterns of the transmitting portions 61 and cancels out a global luminance distribution due to the plurality of the light sources 81. With this configuration, it is possible to provide a surface light source device (e.g., the backlight 4) with a uniform light intensity throughout the emission surface of the backlight 4 (i.e., the emission surface of the diffusion plate 5).

As shown in FIG. 2, the reflective sheet 7 is disposed on an inner surface of the rear housing 9. The reflective sheet 7 is configured to reflect the light emitted from the light sources 81 to the front side (Z1 direction side). The reflective sheet 7 is disposed opposite the optical member 6 on the light source 81 side of the optical member 6. Thus, the reflective sheet 7 is disposed backward (Z2 direction side) with respect to the optical member 6. The reflective sheet 7 also includes a plurality of light source openings 71 at locations corresponding to the light sources 81. The light source openings 71 are arranged such that the light sources 81 project through the light source openings 71 to the optical member 6 side (Z1 direction side) of the reflective sheet 7. This prevents the reflective sheet 7 from being disposed between the light sources 81 and the optical member 6.

The reflective sheet 7 is formed of a resin. The reflective sheet 7 is formed, for example, by a micro-cellular foam resin. The reflective sheet 7 is formed, for example, of a micro-cellular foam polyethylene terephthalate.

The light sources 81 are provided on the substrate 8. The substrate 8 is disposed on the back side (Z2 direction side) of the reflective sheet 7. The light sources 81 each include a light-emitting element. The light sources 81 are configured to emit light by being energized. The light sources 81 include a light emitting diode (LED). The light sources 81 are supported by the rear housing 9 via the substrate 8. The light sources 81 are arranged in a matrix, as shown in FIG. 2. The light sources 81 are exposed in the space formed between the reflective sheet 7 and the optical member 6 by being disposed within the light source openings 71 of the reflective sheet 7, respectively.

As shown in FIG. 4, the optical member 6 is irradiated with the light emitted from the light sources 81 at various angles. Specifically, there are light that reaches directly to the transmitting portions 61 of the optical member 6 and light that reaches the reflective portion 62 and is reflected. Part of the light reflected by the reflective portion 62 is then reflected on the reflective sheet 7 and reaches the transmitting portions 61.

The rear housing 9 is configured to support the display panel 2 from the back side (Z2 direction side), as shown in FIG. 2. The rear housing 9 is formed of metal and has a concave shape that is depressed rearward (Z2 direction). The rear housing 9 is assembled with the front housing 1.

As shown in FIG. 3, a plurality of support members 12 are disposed at different positions from the adhesive layers 11 as viewed from a direction perpendicular to the display surface of the display panel 2 or to the optical member 6 (Z direction). The support members 12 extend in the Z1 direction from the light source 81 side toward the optical member 6 side and is disposed opposite the Z2 side surface of the first protruding portions 51 of the diffusion plate 5 so as to sandwich the optical member 6. Specifically, the support members 12 supports the optical member 6 to maintain a distance between the light sources 81 and the optical member 6. As shown in FIG. 3, the first protruding portions 51 protrude toward the optical member 6 at locations corresponding to the support members 12, respectively. The support members 12 and the first protruding portions 51 of the diffusion plate 5 directly sandwich the optical member 6 therebetween. In the illustrated embodiment, the support members 12 are independently formed as separate members from the diffusion plate 5, the optical member 6 and the reflective sheet 7. However, the support members 12 can be integrally provided to the optical member 6 or the reflective sheet 7, for example.

The air layer 10 is formed between the optical member 6 and the diffusion plate 5 in the Z direction. The air layer 10 is formed between adjacent pairs of the adhesive layers 11 in the X or Y direction. The air layer 10 has a predetermined thickness in the Z direction for sufficiently diffusing the light transmitted through the transmitting portions 61 of the optical member 6. The predetermined thickness of the air layer 10 is, for example, 0.2 mm or more and 1 mm or less. The light transmitted through the transmitting portions 61 diffuses at various angles and reaches the diffusion plate 5. However, if the thickness of the air layer 10 is smaller than 0.2 mm, then the light reaches the diffusion plate 5 before being diffused, which may cause uneven brightness on the emission surface of the diffusion plate 5.

As shown in FIG. 3, the adhesive layers 11 are provided between the diffusion plate 5 and the optical member 6. The adhesive layers 11 bond the diffusion plate 5 and the optical member 6. Specifically, the adhesive layers 11 contact the Z2 side or back surface of the diffusion plate 5 and the Z1 side or front surface of the optical member 6. As shown in FIG.

3, the adhesive layers 11 are columnar in shape. The adhesive layers 11 include an adhesive that is cured by light and other factors other than light. In the first embodiment, the adhesive layers 11 include a light and moisture curable adhesive that is cured by light and moisture. In the illustrated embodiment, the ultraviolet light can be used to cure the light and moisture curable adhesive.

Figure 7:
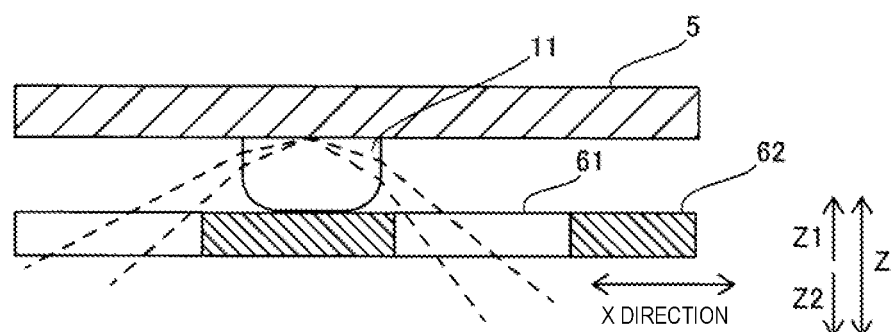
FIG. 7 is a diagram explaining a light condensation by the adhesive layers according to the first embodiment.

As shown in FIG. 7, the adhesive layers 11 include an adhesive with the refractive index greater than the refractive index of the air. In other words, the adhesive layers 11 include an adhesive with the refractive index greater than 1. For example, the adhesive layers 11 preferably include an adhesive with the refractive index of 1.2 or more and 1.6 or less. Due to the large refractive index, the light entering the adhesive layers 11 from the air layer 10 is refracted at an angle less than the angle of incidence. As a result, some of the light incident on the transmitting portions 61 at various angles overlap and are condensed, which appear bright. The adhesive forming the adhesive layers 11 is an acrylic or silicone-based adhesive. Adhesives with high transmittance are preferred so as not to obstruct the light path. The transmittance is preferably more than 90%. Adhesives having a low elasticity are preferred in order to prevent wrinkling of the optical member 6 when pressure is applied for adhering and to prevent separation when the optical member 6 or the diffusion plate 5 is pulled. The adhesives preferably have a modulus of longitudinal elasticity of 10 MPa or less. Thus, in the illustrated embodiment, the diffusion plate 5 and the optical member 6 are secured together by the adhesive layers 11 to prevent the separation between the diffusion plate 5 and the optical member 6. In particular, in the illustrated embodiment, the diffusion plate 5 and the optical member 6 are solely and toollessly secured together by the adhesive layers 11 at locations spaced apart from outer peripheries of the diffusion plate 5 and the optical member 6.

Figure 6A:
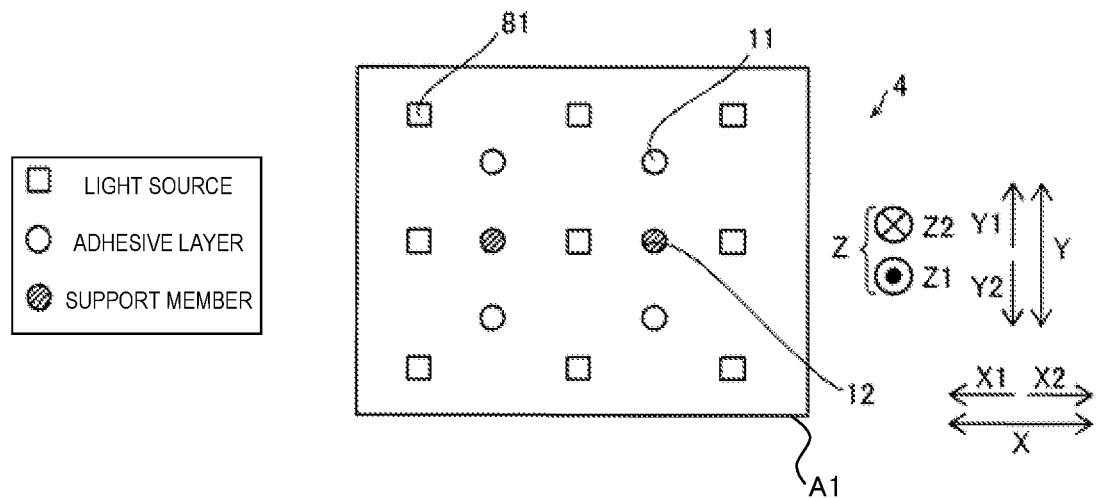
FIG. 6A is a diagram illustrating an arrangement of the adhesive layers and the light sources according to the first embodiment.
Figure 6B:
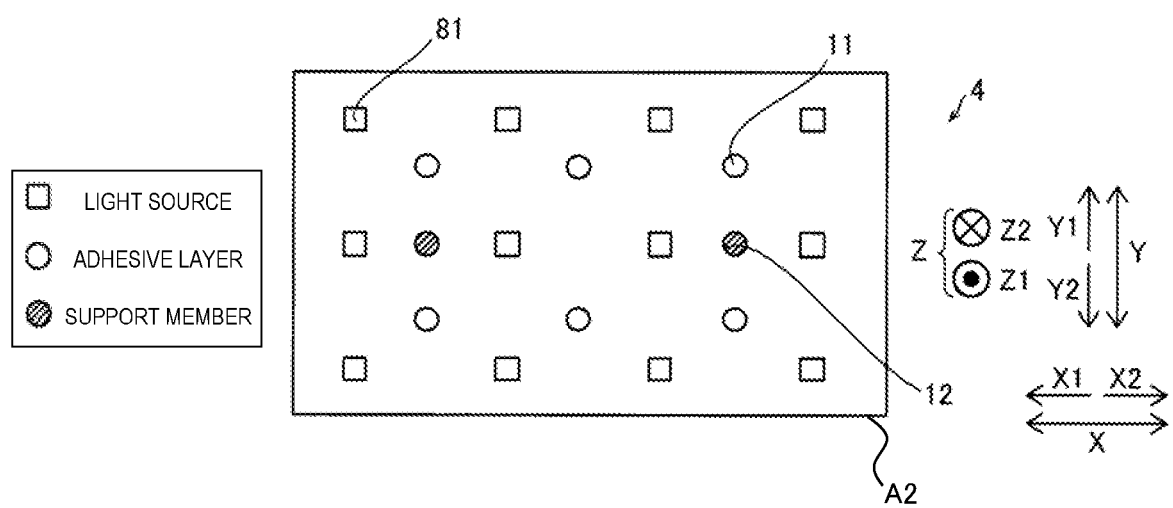
FIG. 6B is a diagram illustrating an arrangement of the adhesive layers and the light sources according to a modified example of the first embodiment.

FIG. 6A illustrates an enlarged diagram of a region A1 of the backlight 4 shown in FIG. 2, showing an arrangement of the adhesive layers 11, the support members 12 and the light sources 81 in the region A1 according to the first embodiment. The reminder region of the backlight 4 other than the region A1 can also have the similar arrangement of the adhesive layers 11, the support members 12 and the light sources 81 that is similar to the arrangement shown in FIG. 6A. FIG. 6B illustrates an enlarged diagram of a region A2 of the backlight 4 shown in FIG. 2, showing a modified arrangement of the adhesive layers 11, the support members 12 and the light sources 81 in the region A2 according to a modification example of the first embodiment. The reminder region of the backlight 4 other than the region A2 can also have the similar arrangement of the adhesive layers 11, the support members 12 and the light sources 81 that is similar to the arrangement shown in FIG. 6B. As shown in FIGS. 6A and 6B, the adhesive layers 11 are arranged spaced apart from each other in the direction in which the optical member 6 extends (X direction and Y direction) as viewed from the diffusion plate 5 side (Z1 side). The light sources 81 are arranged spaced apart from each other in the direction in which the optical member 6 extends (X direction and Y direction) as viewed from the diffusion plate 5 side (Z1 side). The support members 12 are disposed between the light sources 81 and between the adhesive layers 11. The arrangement of the adhesive layers 11 depends on the arrangement of the light sources 81 and the arrangement of the transmitting portions 61 of the optical member 6. The adhesive layers 11 are provided more than the support members 12. Thus, in the illustrated embodiment, the number of the adhesive layers 11 is more than the number of the support members 12. Also, the light sources 81 are provided more than the support members 12. Thus, in the illustrated embodiment, the number of the light sources 81 is more than the number of the support members 12. Also, the light sources 81 are provided more than or equal to the adhesive layers 11.

Specifically, as shown in FIG. 6A, four adhesive layers 11 and two support members 12 are provided for nine light sources 81. With this arrangement, the two support members 12 are aligned with three of the light sources 81 as viewed in the X direction. The support members 12 are disposed between the adjacent pairs of the three of the light sources 81, respectively. As also shown in FIG. 6A, each of the adhesive layers 11 is arranged at or near a center of a rectangle formed by a respective set of four light sources 81, and is equidistant or is substantially equidistant from the respective set of four light sources 81. As also shown in FIGS. 3, 4 and 6A, the adhesive layers 11 and the support members 12 are offset as viewed in the Y direction. However, the arrangement of the adhesive layers 11, the support members 12 and the light sources 81 is not limited to the arrangement shown in FIG. 6A. As shown in FIG. 6B, six adhesive layers 11 and two support members 12 can be provided for twelve light sources 81. With this arrangement, the two support members 12 are aligned with four of the light sources 81 as viewed in the X direction. The support members 12 are disposed between two separate adjacent pairs of the four of the light sources 81, respectively. As also shown in FIG. 6B, each of the adhesive layers 11 is arranged at or near a center of a rectangle formed by a respective set of four light sources 81, and is equidistant or is substantially equidistant from the respective set of four light sources 81. As shown in FIG. 6B, each of the support members 12 is aligned with a respective set of two adhesive layers 11 as viewed in the Y direction. In the illustrated embodiment, as shown in FIGS. 6A and 6B, the support members 12 are provided less than the light sources 81. In particular, the support members 12 are provided equal to or less than half, one-third, one-fourth or one-sixth of the light sources 81. In the illustrated embodiment, as also shown in FIGS. 6A and 6B, the support members 12 are provided less than the adhesive layers 11. In particular, the support members 12 are provided equal to or less than half or one-third of the adhesive layers 11. In the illustrated embodiment, as also shown in FIGS. 6A and 6B, the adhesive layers 11 are provided less than the light sources 81. In particular, the adhesive layers 11 are provided equal to or less than half of the light sources 81.

In the illustrated embodiment, as shown in FIGS. 3, 4 and 7, the adhesive layers 11 are arranged relative to the optical member 6 such that the adhesive layers 11 contact the reflective portion 62 of the optical member 6. In the illustrated embodiment, as shown in FIG. 8, the adhesive layers 11 can be arranged to at least partially cover the transmitting portions 61 of the optical member 6.

Figure 8:
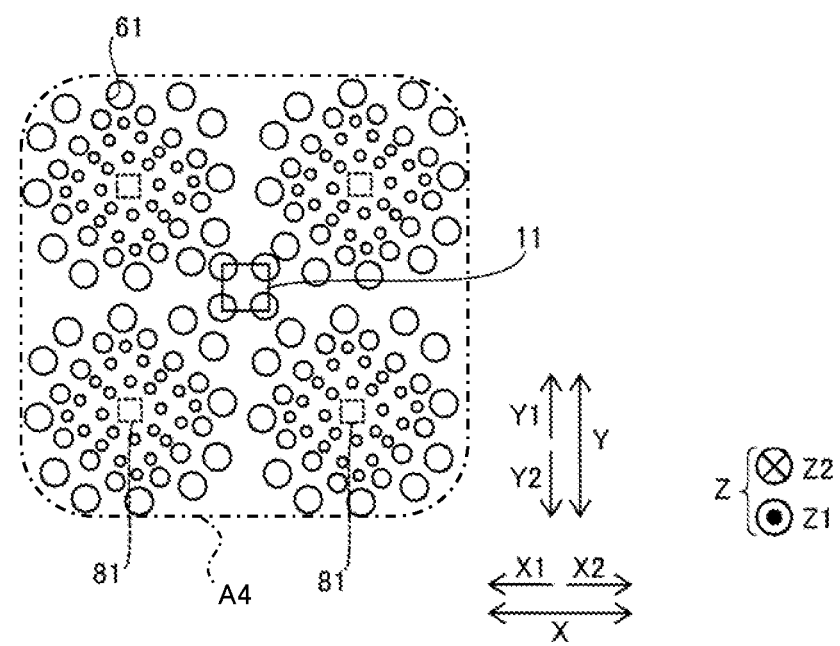
FIG. 8 is a diagram illustrating an arrangement of the adhesive layers according to the first embodiment.
Figure 9:
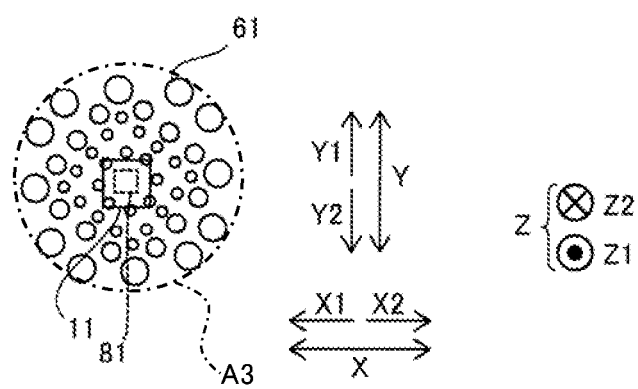
FIG. 9 is a diagram illustrating an arrangement of adhesive layers according to a second embodiment.

Furthermore, as shown in FIG. 8, in the first embodiment, the adhesive layers 11 are disposed between the light sources 81. In particular, each of the adhesive layers 11 is arranged at or near the center of the rectangle formed by the respective set of four light sources 81, and is equidistant or is substantially equidistant from the respective set of four light sources 81. As mentioned above, in the illustrated embodiment, the predetermined pattern of the transmitting portions 61 is provided for each of the light sources 81 such that the optical member 6 have the transmittance distributions corresponding to the arrangements of the light sources 81. In the illustrated embodiment, the optical member 6 is designed such that, in each predetermined region A4 that encircles a respective set of four predetermined patterns of the transmitting portions 61 for a respective set of four light sources 81, the middle region that is equidistant or substantially equidistant from the respective set of four light sources 81 has the largest aperture ratio or transmittance. In the illustrated embodiment, each of the adhesive layers 11 is disposed in this middle region of each predetermined region A4. In other words, in the illustrated embodiment, each of the adhesive layers 11 is disposed at a location where the optical member 61 has the maximum aperture ratio or transmittance in each predetermined region A4.

In other words, in the illustrated embodiment, the adhesive layers 11 are disposed in regions where the ratio of the size of the transmitting portions 61 per unit area is maximum, respectively. The regions where the ratio of the size of the transmitting portions 61 per unit area is maximum are the middle regions between the light sources 81 in the direction in which the optical member 6 extends. Since the light emitted from the light sources 81 is difficult to reach these regions, the size of the transmitting portions 61 is made larger than the other transmitting portions 61 in order to capture more light in these regions. Therefore, the middle regions between the light sources 81 have the largest ratio of the size of the transmitting portions 61 per unit area. In other words, these regions are the regions where the area ratio of the transmitting portions 61 to the reflective portion 62 is at its maximum. By placing the adhesive layers 11 in these regions, respectively, due to the large transmitting portions 61 of the optical member 6, it is easier to transmit large amount of light, and the light amount can be increased by condensing the light by the adhesive layers 11. As a result, it is possible to increase the light amount in the regions where the light is difficult to reach, or in other words, darker regions than other region, and thus the difference in the light amount between these regions and the other regions can be reduced. As a result, the light incident on the diffusion plate 5 becomes uniform throughout the emission surface of the diffusion plate 5.

In the method of bonding the diffusion plate 5 and the optical member 6, the adhesive is first applied to the diffusion plate 5 or the optical member 6 and irradiated with the ultraviolet light for a primary curing. Since the adhesive becomes a gel by the primary curing, wetting and spreading of the applied adhesive can be prevented until the diffusion plate 5 and the optical member 6 are attached together. As a result, the adhesive can maintain the desired thickness and desired shape. The adhesive is applied to one of the diffusion plate 5 and the optical member 6 so as to have the same or slightly greater thickness than the air layer 10. Then, relative to the one of the diffusion plate 5 and the optical member 6 to which the adhesive is applied, the other one of the diffusion plate 5 and the optical member 6 to which the adhesive has not been applied is overlapped, and is pressed with a pressure of 12 kPa or more and 20 kPa or less. The press is performed by using a load by a weight, a spring or a cylinder, a driving force of the actuator, and a dead weight of the diffusion plate 5. Then, the diffusion plate 5 and the optical member 6 are bonded to each other by a secondary curing. The secondary curing can be done by humidification or by indoor moisture. By the press, the diffusion plate 5 and the optical member 6 are attached to each other to achieve the desired spacing (designed thickness of the air layer 10 and the adhesive layers 11). The first protruding portion 51 also functions as a spacer for the attachment.

Effect of First Embodiment

In the first embodiment, the following effects can be achieved.

In the first embodiment, as described above, the liquid crystal television device 100 comprises the adhesive layers 11 bonding the optical member 6 and the diffusion plate 5 with the air layer 10 therebetween. The adhesive layers 11 are arranged spaced apart from each other in the direction in which the optical member 6 extends. The air layer 10 has the same thickness as the adhesive layers 11 and is located between the adjacent pairs of the adhesive layers 11. With this configuration, the optical member 6 is supported by the diffusion plate 5 by bonding the optical member 6 and the diffusion plate 5 via the adhesive layers 11. Thus, the optical member 6 can be prevented from deflecting even if a large number of support members 12 are not arranged. The adhesive layers 11 are arranged spaced apart from each other in the direction in which the optical member 6 extends, and the air layer 10 between the optical member 6 and the diffusion plate 5 has the same thickness as the adhesive layers 11 and is located between the adjacent pairs of the adhesive layers 11. Thus, the refraction of light can be suppressed, which improves the diffusion effect of light. As a result, it is possible to suppress the deflection of the optical member 6 and to improve the light diffusion effect while reducing the number of the support members 12.

In the first embodiment, as described above, the adhesive layers 11 have a refractive index greater than that of the air and is configured to condense a portion of the light from the light sources 81. With this configuration, due to the large refractive index of the adhesive layers 11, the light entering the adhesive layers 11 from the air layer 10 is refracted at an angle less than the angle of incidence. Thus, the brightness can be increased by the adhesive layers 11 gathering the light emitted at different angles from the light sources 81. Therefore, the brightness can be increased by placing the adhesive layers 11 in the darker regions than other regions, which makes the brightness distribution of the liquid crystal television device uniform.

In the first embodiment, as described above, the adhesive layers 11 include an adhesive having the property of being cured by light. With this configuration, as the adhesive layers 11 include an adhesive having the property of being cured by light, the optical member 6 and the diffusion plate 5 can be easily bonded to each other by irradiating with light.

In the first embodiment, as described above, the adhesive layers 11 include an adhesive having the property of being cured by light and the property of being cured by factors other than light. With this configuration, as the adhesive that is cured by light is used, the surfaces of the adhesive layers 11 can be cured by first irradiating with the light after the adhesive layers 11 are provided. Therefore, by curing the adhesive layers 11, the adhesive layers 11 can be prevented from spreading in the direction in which the optical member 6 extends when the adhesive layers 11 are sandwiched between the diffusion plate 5 and the optical member 6. This makes it easy to set the thickness of the adhesive layers 11 to an arbitrary size. By curing the adhesive layers 11 by the factors other than light, the adhesive layers 11 can be cured to the inside of the adhesive layers 11 by the factors other than light after the optical member 6 and the diffusion plate 5 are attached together. As a result, after attaching the optical member 6 and the diffusion plate 5 together, the optical member 6 and the diffusion plate 5 can be securely bonded to each other without increasing the intensity of the irradiated light.

In the first embodiment, the adhesive layers 11 include a light and moisture curable adhesive that is cured by light and moisture. With this configuration, the surfaces of the adhesive layers 11 can be cured by first irradiating with light after the adhesive layers 11 have been provided on the optical member 6 or the diffusion plate 5. Therefore, by curing the adhesive layers 11, the adhesive layers 11 can be prevented from spreading in the direction in which the optical member 6 extends when the adhesive layers 11 are sandwiched between the diffusion plate 5 and the optical member 6. In addition, because the adhesive layers 11 can be cured by moisture after the optical member 6 and the diffusion plate 5 are attached together, the moisture in the air can sufficiently cure the adhesive layers 11 even when it is difficult to sufficiently irradiate the adhesive layers 11 with light after the optical member 6 and the diffusion plate 5 are bonded together. As a result, the optical member 6 and the diffusion plate 5 can be bonded more securely.

In the first embodiment, as described above, the transmitting portions 61 of the optical member 6 includes the through holes, and the adhesive layers 11 are arranged to at least partially cover the through holes. With this configuration, even if the light transmitting through the transmitting portions 61 of the optical member 6 is less than in the other regions, the light is condensed by having the adhesive layers 11 to increase the luminance, and thus the uniformity of the luminance distribution of the liquid crystal television device 100 can be improved.

In the first embodiment, as described above, the plurality of the light sources 81 are provided, and the adhesive layers 11 are disposed between the adjacent pairs of the light sources 81, respectively, in the direction in which the optical member 6 extends as viewed from the direction perpendicular to the display surface of the display panel 2 (e.g., as viewed from the diffusion plate 5 side). Here, the regions between the light sources 81 are darker than the other regions of the optical member 6 because less light is transmitted in these regions or reaches these regions than the other regions of the optical member 6. Therefore, by arranging the adhesive layers 11 between the adjacent pairs of the light sources 81 in the direction in which the optical member 6 extends, the brightness of the region between the light source 81 and the light source 81 can be increased because the light is condensed by the adhesive layers 11. As a result, the uniformity of the luminance distribution of the liquid crystal television device 100 can be further improved.

In the first embodiment, as described above, each of the adhesive layers 11 is disposed at a location where the optical member 6 (the transmitting portions 61) has a maximum transmittance in a respective one of predetermined regions A4 of the optical member 6. For example, the adhesive layers 11 are disposed in the regions where the ratio of the size of the transmitting portions 61 per unit area is maximum. Here, the regions of the optical member 6 away from the light sources 81 tend to become darker than other regions. Thus, the optical member 6 is designed such that the size of the transmitting portions 61 per unit area is maximum in these regions in order to transmit the light from the light sources 81 in these regions more than other regions. Therefore, by providing the adhesive layers 11 in these regions where the ratio of the size of the transmitting portions 61 per unit area is maximum, the light from the light sources 81 can be condensed and thus the regions of the optical member 6 away from the light sources 81 can be made brighter. As a result, the uniformity of the luminance distribution of the liquid crystal television device 100 can be further improved.

In the first embodiment, as described above, the diffusion plate 5 includes the first protruding portions 51 that protrude toward the optical member 6 by the protrusion amount that is equal to the thickness of the air layer 10. With this configuration, the thickness of the air layer 10 between the diffusion plate 5 and the optical member 6 can be secured more reliably by providing the first protruding portions 51.

In the first embodiment, as described above, the backlight 4 has the adhesive layers 11 bonding the optical member 6 and the diffusion plate 5 with the air layer 10 therebetween. The adhesive layers 11 are arranged spaced apart from each other in the direction in which the optical member 6 extends. The air layer 10 has the same thickness as the adhesive layers 11 and is located between the adjacent pairs of the adhesive layers 11. With this configuration, the optical member 6 is supported by the diffusion plate 5 by bonding the optical member 6 and the diffusion plate 5 via the adhesive layers 11. Thus, the optical member 6 can be prevented from deflecting even if a large number of support members 12 are not arranged. The adhesive layers 11 are arranged spaced apart from each other in the direction in which the optical member 6 extends, and the air layer 10 between the optical member 6 and the diffusion plate 5 has the same thickness as the adhesive layers 11 is located between the adjacent pairs of the adhesive layers 11 Thus, the refraction of light can be suppressed, which improves the diffusion effect of light and enables uniform irradiation with light.

Second Embodiment

Next, referring to FIGS. 1 and 9 to 11B, the configuration of the backlight 4 of a liquid crystal television device 200 according to a second embodiment will be described. In the second embodiment, unlike the first embodiment, each of the adhesive layers 11 is disposed at a location where the optical member 6 (the transmitting portions 61) has a minimum transmittance in a respective one of predetermined regions A3 of the optical member 6. In other words, in the illustrated embodiment, the adhesive layers 11 are disposed in regions where the ratio of the size of the transmitting portions 61 per unit area is minimum, respectively.

Figure 10:
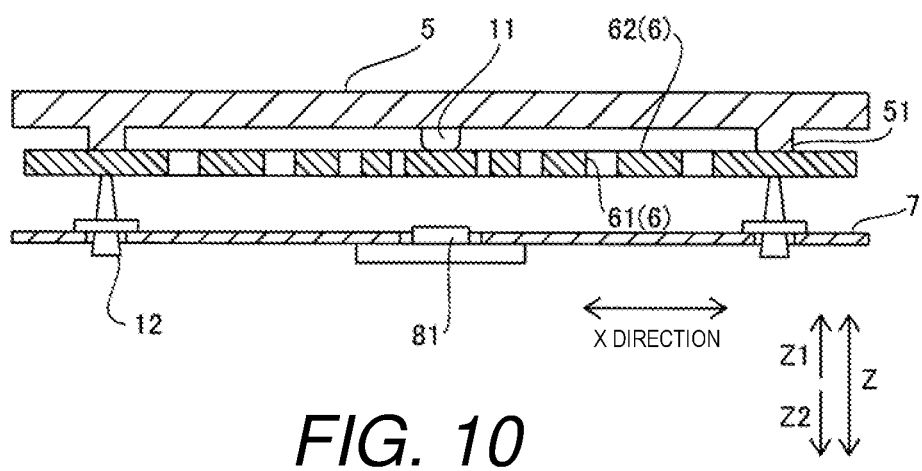
FIG. 10 is a diagram illustrating an arrangement of the adhesive layers and support members according to the second embodiment.

As mentioned above, in the illustrated embodiment, the aperture ratio or transmittance of the optical member 6 becomes larger as moving away from each of the light sources 81 in the predetermined region A3 (i.e., as moving outward in the predetermined region A3), while the aperture ratio or transmittance of the optical member 6 becomes smaller as moving toward each of the light sources 81 in the predetermined region A3 (i.e., as moving inward in the predetermined region A3). In the illustrated embodiment, as shown in FIGS. 9 to 11B, the adhesive layers 11 are disposed in the regions where the ratio of the size of the transmitting portions 61 per unit area is minimum, respectively. In particular, the regions in which the ratio of the size of the transmitting portions 61 per unit area is minimum are regions of the optical member 6 that are opposite the light sources 81 and at the same positions as the light sources 81 in the direction in which the optical member 6 extends (X direction and Y direction). These regions of the optical member 6 each tend to receive a large amount of light from the light sources 81. Thus, the area or size of the transmitting portions 61 is made smaller than the other transmitting portions 61 or the transmitting portions 61 are not formed at all in these regions of the optical member 6 to achieve the uniformity of the luminance distribution of the backlight 4. Therefore, in these regions of the optical member 6, the ratio of the size of the transmitting portions 61 per unit area is minimum. FIG. 10 shows a cross section along the X direction, but the same is true for the cross section along the Y direction.

Figure 11A:
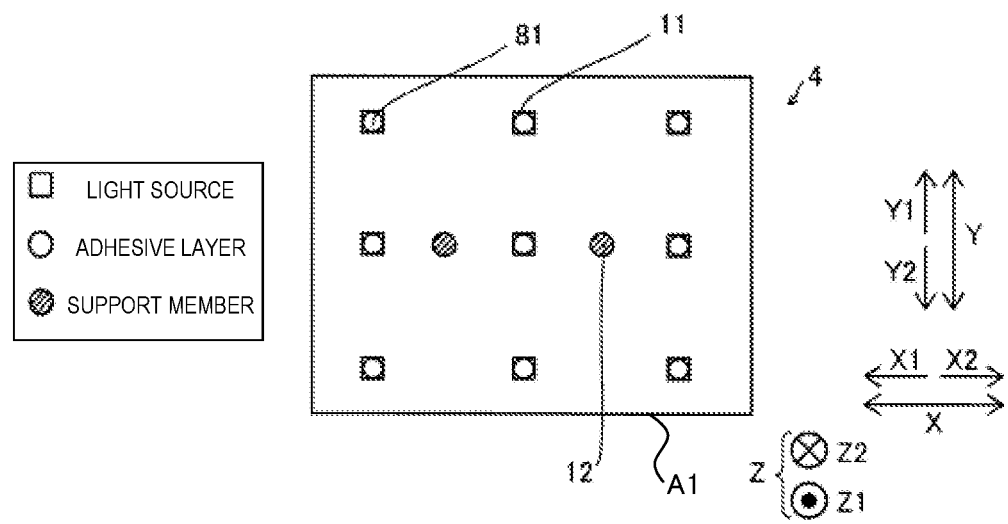
FIG. 11A is a diagram illustrating an arrangement of the adhesive layers and light sources according to the second embodiment.
Figure 11B:
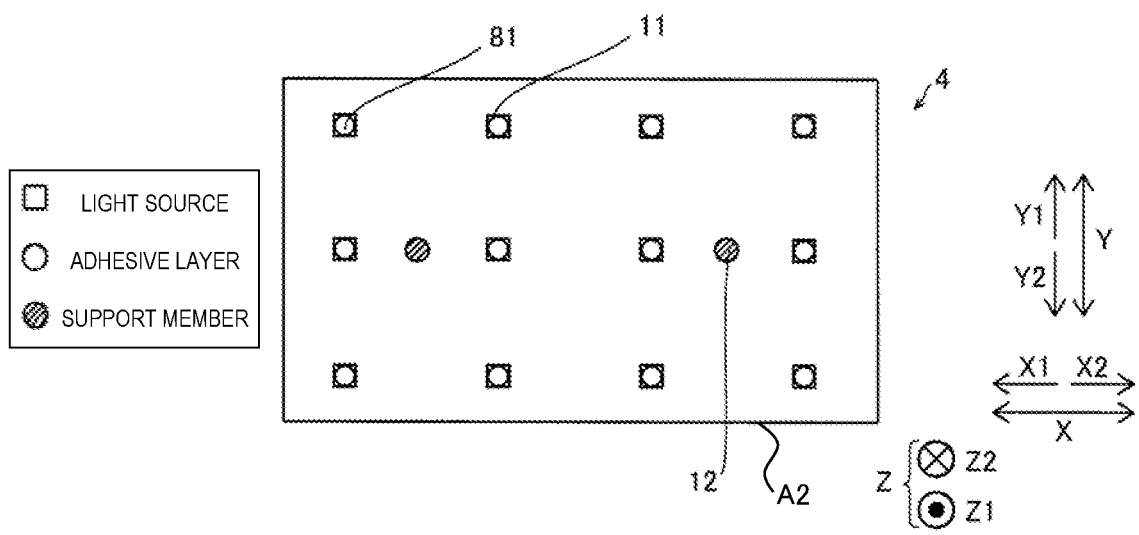
FIG. 11B is a diagram illustrating an arrangement of the adhesive layers and light sources according to a modified example of the second embodiment.

FIG. 11A illustrates an enlarged diagram of the region A1 of the backlight 4 shown in FIG. 2, showing an arrangement of the adhesive layers 11, the support members 12 and the light sources 81 in the region A1 according to the second embodiment. The reminder region of the backlight 4 other than the region A1 can also have the similar arrangement of the adhesive layers 11, the support members 12 and the light sources 81 that is similar to the arrangement shown in FIG. 11A. FIG. 11B illustrates an enlarged diagram of the region A2 of the backlight 4 shown in FIG. 2, showing a modified arrangement of the adhesive layers 11, the support members 12 and the light sources 81 in the region A2 according to a modification example of the second embodiment. The reminder region of the backlight 4 other than the region A2 can also have the similar arrangement of the adhesive layers 11, the support members 12 and the light sources 81 that is similar to the arrangement shown in FIG. 11B. As shown in FIGS. 11A and 11B, the adhesive layers 11 are arranged spaced apart from each other in the direction in which the optical member 6 extends (X direction and Y direction) as viewed from the diffusion plate 5 side (Z1 side). The light sources 81 are arranged spaced apart from each other in the direction in which the optical member 6 extends (X direction and Y direction) as viewed from the diffusion plate 5 side (Z1 side). The support members 12 are disposed between the light sources 81 and between the adhesive layers 11. The arrangement of the adhesive layers 11 depends on the arrangement of the light sources 81 and the arrangement of the transmitting portions 61 of the optical member 6. The adhesive layers 11 are provided more than the support members 12.

Specifically, as shown in FIGS. 11A and 11B, the adhesive layers 11 are disposed opposite the light sources 81, respectively, such that the adhesive layers 11 overlap with the light sources 81, respectively, as viewed in the direction perpendicular to the display surface of the display panel 2 (i.e., as viewed from the Z1 direction). The arrangements of the support members 12 relative to the light sources 81 in the regions A1 and A2 as shown in FIGS. 11A and 11B are the same as the arrangements of the support members 12 relative to the light sources 81 as shown in FIGS. 6A and 6B, respectively. Thus, the detailed explanation of the arrangements shown in FIGS. 11A and 11B will be omitted for the sake of brevity.

The other configurations of the second embodiment are the same as the first embodiment above.

Effect of Second Embodiment

In the second embodiment, as in the first embodiment above, the liquid crystal television device 200 comprises the adhesive layers 11 bonding the optical member 6 and the diffusion plate 5 with the air layer 10 therebetween. The adhesive layers 11 are arranged spaced apart from each other in the direction in which the optical member 6 extends. The air layer 10 has the same thickness as the adhesive layers 11 and is located between the adjacent pairs of the adhesive layers 11. With this configuration, the optical member 6 is supported by the diffusion plate 5 by bonding the optical member 6 and the diffusion plate 5 via the adhesive layers 11. Thus, the optical member 6 can be prevented from deflecting even if a large number of support members 12 are not arranged. The adhesive layers 11 are arranged spaced apart from each other in the direction in which the optical member 6 extends, and the air layer 10 between the optical member 6 and the diffusion plate 5 has the same thickness as the adhesive layers 11 and is located between the adjacent pairs of the adhesive layers 11. Thus, the refraction of light can be suppressed, which improves the diffusion effect of light. As a result, it is possible to suppress the deflection of the optical member 6 and to improve the light diffusion effect while reducing the number of the support members 12.

In the second embodiment, as described above, the plurality of the light sources 81 are provided, and the adhesive layers 11 are disposed opposed the light sources 81, respectively, such that the adhesive layers 11 overlap with the light sources 81, respectively, as viewed in the direction perpendicular to the display surface of the display panel 2. With this configuration, the adhesive layers 11 are disposed at the same positions as the light sources 81 in the direction in which the optical member 6 extends. Here, the regions of the optical member 6 that are opposite the light sources 81 and are the same positions as the light sources 81 in the direction in which the optical member 6 extends are designed to be dark (i.e., to have lower transmittance) because more light tends to reach these regions. Therefore, the adhesive layers 11 can be made less noticeable by providing the adhesive layers 11 in these regions of the optical member 6 that are designed to be dark.

In the second embodiment, as described above, each of the adhesive layers 11 is disposed at a location where the member 6 (the transmitting portions 61) has a minimum transmittance in a respective one of the predetermined regions A3 of the optical member 6. For example, the adhesive layers 11 are disposed in the regions where the ratio of the size of the transmitting portions 61 per unit area is minimum. Here, the regions of the optical member 6 opposite the light sources 81 tend to become brighter than other regions. Thus, the transmitting portions 61 are designed to be small in these regions in order to prevent these region from becoming brighter than the other regions. Therefore, with this configuration, the small transmitting portions 61 prevent these regions from becoming too brighter than the other regions due to the adhesive layers 11, while the adhesive layers 11 that condense the light prevents these regions from becoming darker than the other regions due to the small transmitting portions 61.

The other effects of the second embodiment are the same as in the first embodiment.

Third Embodiment

Next, referring to FIGS. 1 and 12, the configuration of the backlight 4 of a liquid crystal television device 300 according to a third embodiment will be described. In the third embodiment, unlike the first embodiment, the diffusion plate 5 has a plurality of second protruding portions 52. In the third embodiment, the first protruding portions 51 and the support members 12 are not disposed opposite each other so as to sandwich the optical member 6.

Figure 12:
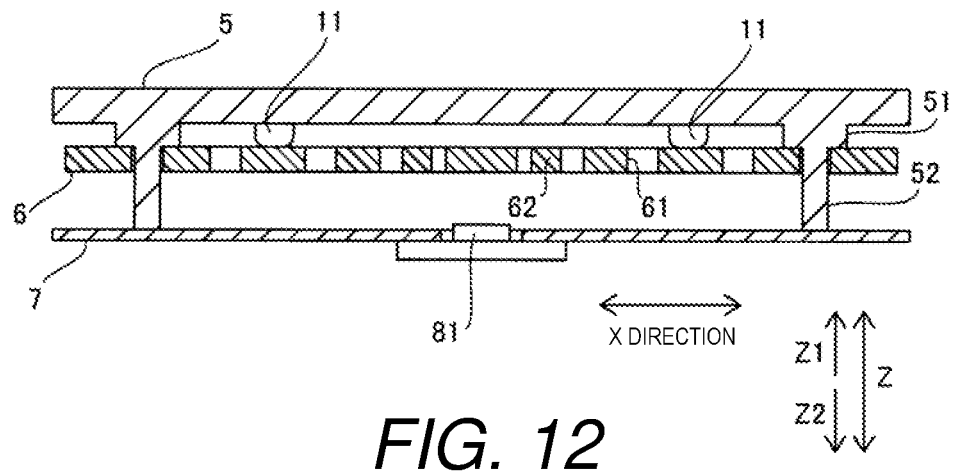
FIG. 12 is a diagram illustrating an arrangement of adhesive layers and support members according to a third embodiment.

As shown in FIG. 12, in the third embodiment, the diffusion plate 5 has the second protruding portions 52 at the positions of the first protruding portions 51, respectively. In FIGS. 3 and 4, the first protruding portions 51 are disposed at the positions of the reflective portion 62, while in FIG. 12, the first protruding portions 51 are disposed at the positions of the transmitting portions 61 and are provided to contact the reflective portion 62 around the transmitting portions 61, respectively. That is, each of the first protruding portions 51 has a diameter greater than the diameter of the respective one of the transmitting portions 61, and covers the respective one of the transmitting portions 61. The second protruding portions 52 are provided at the ends of the first protruding portions 51, respectively, such that the second protruding portions 52 extend or pass through the interiors of the transmitting portions 61, respectively. The second protruding portions 52 extend from the first protruding portions 51 to the reflective sheet 7 side (Z2 side) through the transmitting portions 61. The length of the second protruding portions 52 is not limited, but is designed to maintain a constant distance between the light sources 81 and the optical member 6 so as to allow the light from the light sources 81 to be sufficiently diffused while traveling between the light sources 81 and the optical member 6. In the illustrated embodiment, the second protruding portions 52 is integrally provided to the first protruding portions 51. Thus, the diffusion plate 5 with the first protruding portions 51 and the second protruding portions 52 is integrally formed as a one-piece, unitary member. In the illustrated embodiment, the second protruding portions 52 are columnar in shape. The second protruding portions 52 have a smaller width or diameter in the X direction or the Y direction than the first protruding portions 51, as shown in FIG. 12. The Z2 side surfaces of the second protruding portions 52 contact the Z1 side surface of the reflective sheet 7. Thus, in the illustrated embodiment, the second protruding portions 52 extend from the first protruding portions 51 toward the reflective sheet 7 through the transmitting portions 61 and contact the reflective sheet 7. FIG. 12 shows a cross section along the X direction, but the same is true for the cross section along the Y direction.

The other configurations of the third embodiment are the same as the first embodiment above.

Effect of Third Embodiment

In the third embodiment, as in the first embodiment above, the liquid crystal television device 300 comprises the adhesive layers 11 bonding the optical member 6 and the diffusion plate 5 with the air layer 10 therebetween. The adhesive layers 11 are arranged spaced apart from each other in the direction in which the optical member 6 extends. The air layer 10 has the same thickness as the adhesive layers 11 and is located between the adjacent pairs of the adhesive layers 11. With this configuration, the optical member 6 is supported by the diffusion plate 5 by bonding the optical member 6 and the diffusion plate 5 via the adhesive layers 11. Thus, the optical member 6 can be prevented from deflecting even if a large number of support members 12 are not arranged. The adhesive layers 11 are arranged spaced apart from each other in the direction in which the optical member 6 extends, and the air layer 10 between the optical member 6 and the diffusion plate 5 has the same thickness as the adhesive layers 11 and is located between the adjacent pairs of the adhesive layers 11. Thus, the refraction of light can be suppressed, which improves the diffusion effect of light. As a result, it is possible to suppress the deflection of the optical member 6 and to improve the light diffusion effect while reducing the number of the support members 12.

In the third embodiment, as described above, the liquid crystal television device 300 includes the reflective sheet 7 disposed backward (e.g., on the light source 81 side) with respect to the optical member 6. The reflective sheet 7 is configured to reflect the light from the light sources 81. The diffusion plate 5 further includes the second protruding portions 52 that extend from the first protruding portions 51 toward the reflective sheet 7 (e.g., to the light source 81 side) through the transmitting portions 61 and contact the reflective sheet 7. With this configuration, by having the reflective sheet 7, the light emitted from the light sources 81 and reflected by the reflective portion 62 of the optical member 6 can be reflected to the optical member 6 side. Thus, the light reflected by the reflective portion 62 of the optical member 6 can be reflected to the transmitting portions 61 of the optical member 6. Also, the distance between the diffusion plate 5 and the reflective sheet 7 can be maintained at a constant distance by the second protruding portions 52 of the diffusion plate 5.

The other effects of the third embodiment are the same as in the first embodiment.

Fourth Embodiment

Figure 13:
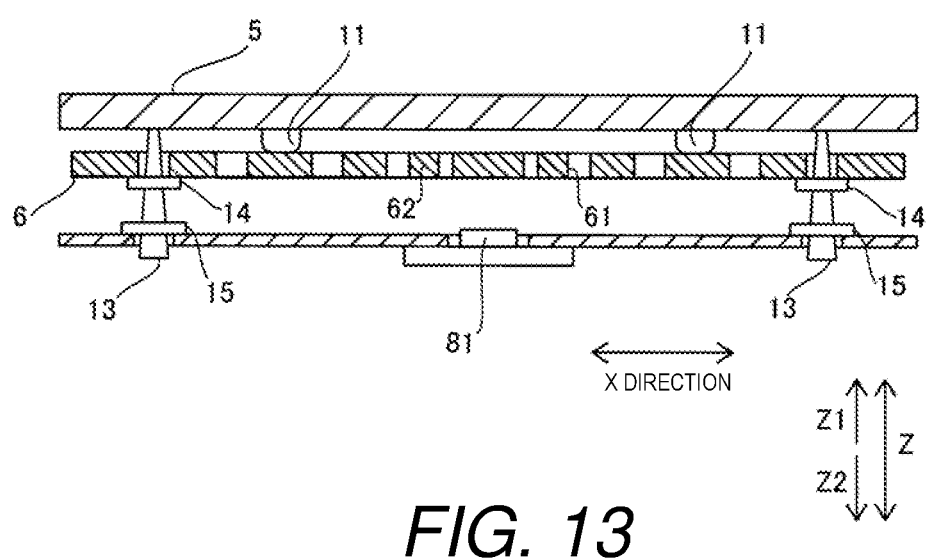
FIG. 13 is a diagram illustrating an arrangement of adhesive layers and support members according to a fourth embodiment.

Next, referring to FIGS. 1 and 13, the configuration of the backlight 4 of a liquid crystal television device 400 according to the fourth embodiment will be described. In the fourth embodiment, unlike the first embodiment, the diffusion plate 5 does not have the first protruding portions 51 and has a plurality of support members 13 extending from the reflective sheet 7 toward the diffusion plate 5.

In the fourth embodiment, the support members 13 are disposed at different positions from the adhesive layers 11 as viewed from a direction (Z direction) perpendicular to the optical member 6. The support members 13 extend from the light source 81 side toward the optical member 6 side and contact the diffusion plate 5 through the transmitting portions 61 of the optical member 6 to support the diffusion plate 5. The Z1 side surfaces of the support members 13 contact the Z2 side surface of the diffusion plate 5. The support members 13 have the diameter that decreases from the Z2 side to the Z1 side. Specifically, the support members 13 each have a distal end portion, a middle portion and a base portion that have the diameter that decreases as moving from the base portion to the distal end portion. Furthermore, the support members 13 each have a flange 14 between the distal end portion and the middle portion, and a fixing portion 15 between the middle portion and the base portion. The flange 14 of each of the support members 13 is provided for shielding or covering the respective one of the transmitting portions 61 of the optical member 6 from the reflective sheet 7 side. Specifically, the flange 14 contacts the reflective portion 62 of the optical member 6 to support the optical member 6. By the support members 13 each having the flange 14, the transmission of light from the transmitting portions 61 in which the support members 13 are provided can be suppressed. In the illustrated embodiment, the flange 14 of each of the support members 13 is larger in diameter than the diameter of the respective one of the transmitting portions 61 of the optical member 6. The distal end portion of each of the support members 13 extending from the flange 14 toward the diffusion plate 5 has the diameter that is smaller than the diameter of the respective one of the transmitting portions 61 of the optical member 6. On the other hand, the Z2 side surfaces (on the reflective sheet 7 side) of the base portions of the support members 13 have a larger diameter than the holes of the reflective sheet 7 in which the base portions of the support members 13 are provided, respectively. Furthermore, the fixing portion 15 of each of the support members 13 is provided for fixing to the optical member 6. The fixing portion 15 contacts the reflective sheet 7. The fixing portions 15 of the support members 13 have a larger diameter than the holes of the reflective sheet 7 in which the base portions of the support members are provided, respectively. FIG. 13 shows a cross section along the X direction, but the same is true for the cross section along the Y direction.

The other configurations of the fourth embodiment are the same as the first embodiment above.

Effect of the Fourth Embodiment

In the fourth embodiment, as in the first embodiment above, the liquid crystal television device 400 comprises the adhesive layers 11 bonding the optical member 6 and the diffusion plate 5 with the air layer 10 therebetween. The adhesive layers 11 are arranged spaced apart from each other in the direction in which the optical member 6 extends. The air layer 10 has the same thickness as the adhesive layers 11 and is located between the adjacent pairs of the adhesive layers 11. With this configuration, the optical member 6 is supported by the diffusion plate 5 by bonding the optical member 6 and the diffusion plate 5 via the adhesive layers 11. Thus, the optical member 6 can be prevented from deflecting even if a large number of the support members 13 are not arranged. The adhesive layers 11 are arranged spaced apart from each other in the direction in which the optical member 6 extends, and the air layer 10 between the optical member 6 and the diffusion plate 5 has the same thickness as the adhesive layers 11 and is located between the adjacent pairs of the adhesive layers 11. Thus, the refraction of light can be suppressed, which improves the diffusion effect of light. As a result, it is possible to suppress the deflection of the optical member 6 and to improve the light diffusion effect while reducing the number of the support members 13.

In the fourth embodiment, as described above, the liquid crystal television device 400 further includes the support members 13 disposed at positions different from the adhesive layers 11 as viewed from the direction perpendicular to the display surface of the display panel 2 or the optical member 6. The support members 13 extend through the transmitting portions 61 of the optical member 6 and contact the diffusion plate 5 to support the diffusion plate 5. For example, the support members 13 extends from the light source 81 side toward the optical member 6 side and contacts the diffusion plate 5 through the transmitting portions 61 of the optical member 6 to support the diffusion plate 5. With this configuration, by providing the support members 13, the optical member 6 can be prevented from deflecting while maintaining a distance between the diffusion plate 5 and the reflective sheet 7 at a constant distance.

The other effects of the fourth embodiment are the same as in the first embodiment.

Modification Example

The embodiments disclosed here are illustrative and are not restrictive in all respects. The scope of the invention is indicated by the claims rather than by the description of the embodiments described above, and furthermore includes all modifications (modification examples) within the meaning and scope of the claims and their equivalents.

For example, in the first to fourth embodiments above, an example of a liquid crystal television device is shown as a display device of the present invention, but the present invention is not limited this. For example, the present invention may be applied to a display device other than a liquid crystal television device. For example, the present invention may be applied to a general display device such as a display device for PCs (personal computers).

In the first to fourth embodiments above, an example of a light and moisture curable adhesive is shown as an adhesive, but the present invention is not limited to this. For example, an adhesive that is cured by light and heat may be used as an adhesive.

In the first to fourth embodiments above, an example of a light and moisture curable adhesive is shown as an adhesive, but the present invention is not limited to this. For example, as an adhesive, an adhesive having a property of curing with light of a wavelength that transmits through the optical member may be used. In this case, the adhesive may be cured by a wavelength of 300 nm or less, which is the wavelength range that transmits through the optical member.

In the first to fourth embodiments above, an example of a light and moisture curable adhesive is shown as an adhesive, but the present invention is not limited to this. For example, a two-component curing adhesive may be used as an adhesive.

In the first to fourth embodiments above, an example of an adhesive with a larger refractive index than the air is shown, but the present invention is not limited to this. For example, an adhesive with a refractive index close to that of the air may be used.

In the first to fourth embodiments above, an example of the adhesive layers that at least partially cover the through holes of the transmitting portions is shown, but the present invention is not limited to this. For example, the adhesive layers may be arranged so that the adhesive layers do not cover the through holes. Also, the adhesive layers may be arranged so that each of the adhesive layers covers at least one entire through hole (i.e., at least one entire transmitting portion) of the optical member.

In the first embodiment above, an example is shown where the adhesive layers are disposed in the regions where the ratio of the size of the transmitting portions per unit area is maximum, but the present invention is not limited to this. For example, the adhesive layers may be disposed in regions that have a higher ratio of the transmitting portions per unit area than other regions, even if the ratio of the transmitting portions per unit area is not maximum. In other words, the adhesive layers may be disposed at locations where the optical member has a higher transmittance or aperture ratio than other locations in the predetermined regions A4.

In the second embodiment above, an example is shown where the adhesive layers are disposed in the regions where the ratio of the size of the transmitting portions per unit area is minimum, but the present invention is not limited to this. For example, the adhesive layers may be disposed in regions that have a smaller ratio of the transmitting portions per unit area than other regions, even if the ratio of the transmitting portions per unit area is not minimum. In other words, the adhesive layers may be disposed at locations where the optical member has a lower transmittance or aperture ratio than other locations in the predetermined regions A3.

In the first to fourth embodiments above, an example is shown where the light sources are arranged in a matrix in the X direction and the Y direction, but the present invention is not limited to this. For example, the light sources may be arranged in a circle.

In the first, second and fourth embodiments above, an example is shown where the support members is provided, but the present invention is not limited to this. For example, the support member need not be provided.

(1) In view of the state of the known technology and in accordance with a first aspect of the present invention, a display device comprises a display panel, at least one light source, a diffusion plate, an optical member, and a plurality of adhesive layers. The diffusion plate is disposed opposite the at least one light source and has an emission surface that faces away from the at least one light source. The diffusion plate is configured to diffuse light from the at least one light source to emit the light from the at least one light source from the emission surface. The optical member is disposed between the diffusion plate and the at least one light source and has at least one transmitting portion that is configured to transmit the light from the at least one light source and a reflective portion that is configured to reflect the light from the at least one light source. The adhesive layers bond the optical member and the diffusion plate with an air layer therebetween. The adhesive layers are arranged spaced apart from each other in a direction in which the optical member extends. The air layer has the same thickness as the adhesive layers and is located between an adjacent pair of the adhesive layers.

The display device according to the first aspect, as described above, has the adhesive layers bonding the optical member and the diffusion plate with the air layer therebetween. The adhesive layers are arranged spaced apart from each other in the direction in which the optical member extends. The air layer has the same thickness as the adhesive layers and is located between the adjacent pair of the adhesive layers. With this configuration, the optical member is supported by the diffusion plate by bonding the optical member and the diffusion plate via the adhesive layers. Thus, the optical member can be prevented from deflecting even if a large number of support members are not arranged. The adhesive layers are arranged spaced apart from each other in the direction in which the optical member extends, and the air layer between the optical member and the diffusion plate has the same thickness as the adhesive layers and is located between the adjacent pair of the adhesive layers. Thus, the refraction of light can be suppressed, which improves the diffusion effect. As a result, it is possible to suppress the deflection of the optical member and to improve the light diffusion effect while reducing the number of support members.

(2) In accordance with a preferred embodiment according to the display device mentioned above, the adhesive layers have a refractive index greater than that of air and is configured to condense a portion of the light from the at least one light source. With this configuration, due to the large refractive index of the adhesive layers, the light entering the adhesive layers from the air layer is refracted at an angle less than the angle of incidence. Thus, the brightness can be increased by the adhesive layers gathering the light emitted at different angles from the at least one light source. Therefore, the brightness can be increased by placing the adhesive layers in darker regions than other regions, which makes the brightness distribution of the display device uniform.

(3) In accordance with a preferred embodiment according to any one of the display devices mentioned above, the adhesive layers include an adhesive having a property of being cured by light. With this configuration, as the adhesive layers include an adhesive having a property of being cured by light, the optical member and the diffusion plate can be easily bonded to each other by irradiating with light.

(4) In accordance with a preferred embodiment according to any one of the display devices mentioned above, the adhesive layers include an adhesive having a property of being cured by light and a property of being cured by factors other than light. With this configuration, as an adhesive that is cured by light is used, surfaces of the adhesive layers can be cured by first irradiating with the light after the adhesive layers are provided. Therefore, by curing the adhesive layers, the adhesive layers can be prevented from spreading in the direction in which the optical member extends when the adhesive layers are sandwiched between the diffusion plate and the optical member. This makes it easy to set the thickness of the adhesive layers to an arbitrary size. By curing the adhesive layers by the factors other than light, the adhesive layers can be cured to the inside of the adhesive layers by the factors other than light after the optical member and the diffusion plate are attached together. As a result, after attaching the optical member and the diffusion plate together, the optical member and the diffusion plate can be securely bonded to each other without increasing the intensity of the irradiated light.

(5) In accordance with a preferred embodiment according to any one of the display devices mentioned above, the adhesive layers include a light and moisture curable adhesive that is cured by light and moisture. With this configuration, the surfaces of the adhesive layers can be cured by first irradiating with light after the adhesive layers have been provided on the optical member or the diffusion plate. Therefore, by curing the adhesive layers, the adhesive layer can be prevented from spreading in the direction in which the optical member extends when the adhesive layers are sandwiched between the diffusion plate and the optical member. In addition, because the adhesive layers can be cured by moisture after the optical member and the diffusion plate are attached together, the moisture in the air can sufficiently cure the adhesive layers even when it is difficult to sufficiently irradiate the adhesive layers with light after the optical member and the diffusion plate are bonded together. As a result, the optical member and the diffusion plate can be bonded more securely.

(6) In accordance with a preferred embodiment according to any one of the display devices mentioned above, the at least one transmitting portion of the optical member includes a plurality of through holes, and the adhesive layers are arranged to at least partially cover the through holes. With this configuration, even if the light transmitting through the at least one transmitting portion of the optical member is less than in other regions, the light is condensed by having the adhesive layers to increase the luminance, and thus the uniformity of the luminance distribution of the display device can be improved.

(7) In accordance with a preferred embodiment according to any one of the display devices mentioned above, the at least one light source includes a plurality of the light sources, and the adhesive layers are disposed between adjacent pairs of the light sources, respectively, in the direction in which the optical member extends as viewed from a direction perpendicular to a display surface of the display panel. Here, regions between the light sources are darker than other regions of the optical member because less light reaches the regions between the light sources than the other regions of the optical member. Therefore, by arranging the adhesive layers between the adjacent pairs of the light sources in the direction in which the optical member extends, the brightness of the regions between the light sources can be increased because the light is condensed by the adhesive layers. As a result, the uniformity of the luminance distribution of the display device can be further improved.

(8) In accordance with a preferred embodiment according to any one of the display devices mentioned above, each of the adhesive layers is disposed at a location where the at least one transmitting portion has a maximum transmittance in a respective one of predetermined regions of the optical member. For example, the adhesive layers are disposed in regions where the ratio of the size of the at least one transmitting portion per unit area is maximum. Here, the regions of the optical member away from the light sources tend to become darker than other regions. Thus, the optical member is designed such that the size of the at least one transmitting portion per unit area is maximum in these regions in order to transmit the light from the light source in these regions more than the other regions. Therefore, by providing the adhesive layers in these regions where the ratio of the size of the transmitting portion per unit area is maximum, the light from the light source can be condensed and thus the regions of the optical member away from the light sources can be made brighter. As a result, the uniformity of the luminance distribution of the display device can be further improved.

(9) In accordance with a preferred embodiment according to any one of the display devices mentioned above, the at least one light source includes a plurality of light sources, and the adhesive layers are disposed opposite the light source, respectively, such that the adhesive layers overlap with the light sources, respectively, as viewed in a direction perpendicular to a display surface of the display panel. With this configuration, the adhesive layers are disposed at the same positions as the light sources in the direction in which the optical member extends, for example. Here, regions of the optical member that are opposite the light sources and are the same positions as the light sources in the direction in which the optical member extends are designed to be dark (i.e., to have lower transmittance) because more light tends to reach these regions. Therefore, the adhesive layers can be made less noticeable by providing the adhesive layers in these regions of the optical member that are designed to be dark.

(10) In accordance with a preferred embodiment according to any one of the display devices mentioned above, each of the adhesive layers is disposed at a location where the at least one transmitting portion has a minimum transmittance in a respective one of predetermined regions of the optical member. For example, the adhesive layers are disposed in regions where the ratio of the size of the at least one transmitting portion per unit area is minimum. Here, the regions of the optical member opposite the light sources tend to become brighter than other regions. Thus, the at least one transmitting portion is designed to be small in these regions in order to prevent these regions from becoming brighter than the other regions. Therefore, with the above-mentioned configuration, the small transmitting portion prevents these regions from becoming too brighter than the other regions due to the adhesive layers, while the adhesive layers that condense the light prevents these regions from becoming darker than the other regions due to the small transmitting portion.

(11) In accordance with a preferred embodiment according to any one of the display devices mentioned above, the diffusion plate includes a first protruding portion that protrudes toward the optical member by a protrusion amount that is equal to a thickness of the air layer. With this configuration, the thickness of the air layer between the diffusion plate and the optical member can be secured more reliably by providing the first protruding portion.

(12) In accordance with a preferred embodiment according to any one of the display devices mentioned above, the display device further comprises a reflective sheet disposed backward with respect to the optical member, the reflective sheet being configured to reflect the light from the at least one light source. The diffusion plate further includes a second protruding portion that extends from the first protruding portion toward the reflective sheet through the at least one transmitting portion and contacts the reflective sheet. With this configuration, by having the reflective sheet, the light emitted from the at least one light source and reflected by the reflective portion of the optical member can be reflected to the optical member side. Thus, the light transmitting through the optical member can be sufficiently ensured. Also, the distance between the diffusion plate and the reflective sheet can be maintained at a constant distance by the second protruding portion of the diffusion plate.

(13) In accordance with a preferred embodiment according to any one of the display devices mentioned above, the display device further comprises a support member disposed at a position different from the adhesive layers as viewed from a direction perpendicular to a display surface of the display panel, the support member extending through the at least one transmitting portion and contacting the diffusion plate to support the diffusion plate. For example, the support member extends from the light source side toward the optical member side and contacts the diffusion plate through the transmitting portion of the optical member to support the diffusion plate. With this configuration, by providing the support member, the optical member can be prevented from deflecting while maintaining a distance between the diffusion plate and the reflective sheet at a constant distance.

(14) In accordance with a preferred embodiment according to any one of the display devices mentioned above, the optical member is formed as a sheet-like member.

(15) In view of the state of the known technology and in accordance with a second aspect of the present invention, a surface light source device comprises at least one light source, a diffusion plate, an optical member, and a plurality of adhesive layers. The diffusion plate is disposed opposite the at least one light source and has an emission surface that faces away from the at least one light source. The diffusion plate is configured to diffuse light from the at least one light source to emit the light from the at least one light source from the emission surface. The optical member is disposed between the diffusion plate and the at least one light source and has at least one transmitting portion that is configured to transmit the light from the light source and a reflective portion that is configured to reflect the light from the at least one light source. The adhesive layers bond the optical member and the diffusion plate with an air layer therebetween. The adhesive layers are arranged spaced apart from each other in a direction in which the optical member extends. The air layer has the same thickness as the adhesive layers and is located between an adjacent pair of the adhesive layers.

The surface light source device according to the second aspect, as descried above, has the adhesive layers bonding the optical member and the diffusion plate with the air layer therebetween. The adhesive layers are arranged spaced apart from each other in the direction in which the optical member extends. The air layer has the same thickness as the adhesive layers and is located between the adjacent pair of the adhesive layers. With this configuration, the optical member is supported by the diffusion plate by bonding the optical member and the diffusion plate via the adhesive layers. Thus, the optical member can be prevented from deflecting even if a large number of support members are not arranged. The adhesive layers are arranged spaced apart from each other in the direction in which the optical member extends, and the air layer between the optical member and the diffusion plate has the same thickness as the adhesive layer is located between the adjacent pair of the adhesive layers.

Thus, the refraction of light can be suppressed, which improves the diffusion effect of light and enables uniform irradiation with light.

(16) In accordance with a preferred embodiment according to any one of the display devices mentioned above, the optical member and the diffusion plate are secured together by the adhesive layers to prevent separation of the optical member and the diffusion plate.

(17) In accordance with a preferred embodiment according to any one of the display devices mentioned above, the display device further comprises a plurality of support members supporting the optical member to maintain a distance between the at least one light source and the optical member.

(18) In accordance with a preferred embodiment according to any one of the display devices mentioned above, the at least one light source includes a plurality of light sources, and a number of the light sources is more than a number of the support members.

(19) In accordance with a preferred embodiment according to any one of the display devices mentioned above, the diffusion plate includes a plurality of first protruding portions that protrude toward the optical member at locations corresponding to the support members, respectively, and the support members and the first protruding portions of the diffusion plate directly sandwich the optical member therebetween.

(20) In accordance with a preferred embodiment according to any one of the display devices mentioned above, the support member have a flange that contacts the reflective portion of the optical member to support the optical member.

According to the present invention, as described above, it is possible to provide a display device and a surface light source device that can suppress deflection of an optical member and improve the diffusion effect of light while reducing the number of support members.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a liquid crystal display device in an upright position. Accordingly, these directional terms, as utilized to describe the liquid crystal display device should be interpreted relative to a liquid crystal display device in an upright position on a horizontal surface.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A display device comprising:
a display panel;
at least one light source;
a diffusion plate disposed opposite the at least one light source and having an emission surface that faces away from the at least one light source, the diffusion plate diffusing light from the at least one light source to emit the light from the at least one light source from the emission surface;
an optical member disposed between the diffusion plate and the at least one light source and having at least one transmitting portion that transmits the light from the at least one light source and a reflective portion that reflects the light from the at least one light source, the at least one transmitting portion including a plurality of through holes; and
a plurality of adhesive layers bonding the optical member and the diffusion plate with an air layer therebetween, the adhesive layers being arranged spaced apart from each other in a direction in which the optical member extends,
the air layer having the same thickness as the adhesive layers and being located between an adjacent pair of the adhesive layers, and
the adhesive layers being arranged to at least partially overlap with the through holes as viewed in a direction perpendicular to the emission surface of the diffusion plate.

2. The display device according to claim 1, wherein the adhesive layers have a refractive index greater than that of air and condenses a portion of the light from the at least one light source.

3. The display device according to claim 1, wherein
the adhesive layers include an adhesive having a property of being cured by light.
4. The display device according to claim 3, wherein
the adhesive layers include an adhesive having a property of being cured by light and a property of being cured by factors other than light.
5. The display device according to claim 4, wherein
the adhesive layers include a light and moisture curable adhesive that is cured by light and moisture.
6. The display device according to claim 1, wherein
the diffusion plate includes a first protruding portion that protrudes toward the optical member by a protrusion amount that is equal to a thickness of the air layer.
7. The display device according to claim 6, further comprising
a reflective sheet disposed backward with respect to the optical member, the reflective sheet reflecting the light from the at least one light source,
the diffusion plate further including a second protruding portion that extends from the first protruding portion toward the reflective sheet through the at least one transmitting portion and contacts the reflective sheet.
8. The display device according to claim 1, wherein
the optical member is formed as a sheet-like member.
9. The display device according to claim 1, wherein
the optical member and the diffusion plate are secured together by the adhesive layers to prevent separation of the optical member and the diffusion plate.
10. The display device according to claim 1, further comprising
a plurality of support members supporting the optical member to maintain a distance between the at least one light source and the optical member.
11. The display device according to claim 10, wherein
the at least one light source includes a plurality of light sources, and
a number of the light sources is more than a number of the support members.
12. The display device according to claim 10, wherein
the diffusion plate includes a plurality of first protruding portions that protrude toward the optical member at locations corresponding to the support members, respectively, and
the support members and the first protruding portions of the diffusion plate directly sandwich the optical member therebetween.
13. A display device comprising:
a display panel;
at least one light source;
a diffusion plate disposed opposite the at least one light source and having an emission surface that faces away from the at least one light source, the diffusion plate diffusing light from the at least one light source to emit the light from the at least one light source from the emission surface;
an optical member disposed between the diffusion plate and the at least one light source and having at least one transmitting portion that transmits the light from the at least one light source and a reflective portion that reflects the light from the at least one light source; and
a plurality of adhesive layers bonding the optical member and the diffusion plate with an air layer therebetween, the adhesive layers being arranged spaced apart from each other in a direction in which the optical member extends,
the air layer having the same thickness as the adhesive layers and being located between an adjacent pair of the adhesive layers,
the at least one light source including a plurality of light sources, and
the adhesive layers being disposed between adjacent pairs of the light sources, respectively, in the direction in which the optical member extends as viewed from a direction perpendicular to a display surface of the display panel.
14. The display device according to claim 13, wherein
each of the adhesive layers is disposed at a location where the at least one transmitting portion has a maximum transmittance in a respective one of predetermined regions of the optical member.
15. A display device comprising:
a display panel;
at least one light source;
a diffusion plate disposed opposite the at least one light source and having an emission surface that faces away from the at least one light source, the diffusion plate diffusing light from the at least one light source to emit the light from the at least one light source from the emission surface;
an optical member disposed between the diffusion plate and the at least one light source and having at least one transmitting portion that transmits the light from the at least one light source and a reflective portion that reflects the light from the at least one light source; and
a plurality of adhesive layers bonding the optical member and the diffusion plate with an air layer therebetween, the adhesive layers being arranged spaced apart from each other in a direction in which the optical member extends,
the air layer having the same thickness as the adhesive layers and being located between an adjacent pair of the adhesive layers,
the at least one light source including a plurality of light sources, and
the adhesive layers being disposed opposite the light sources, respectively, such that the adhesive layers overlap with the light sources, respectively, as viewed in a direction perpendicular to a display surface of the display panel.
16. The display device according to claim 15, wherein
each of the adhesive layers is disposed at a location where the at least one transmitting portion has a minimum transmittance in a respective one of predetermined regions of the optical member.
17. A display device comprising:
a display panel;
at least one light source;
a diffusion plate disposed opposite the at least one light source and having an emission surface that faces away from the at least one light source, the diffusion plate diffusing light from the at least one light source to emit the light from the at least one light source from the emission surface;
an optical member disposed between the diffusion plate and the at least one light source and having at least one transmitting portion that transmits the light from the at least one light source and a reflective portion that reflects the light from the at least one light source:
a plurality of adhesive layers bonding the optical member and the diffusion plate with an air layer therebetween, the adhesive layers being arranged spaced apart from each other in a direction in which the optical member extends; and a support member disposed at a position different from the adhesive layers as viewed from a direction perpendicular to a display surface of the display panel, the support member extending through the at least one transmitting portion and contacting the diffusion plate to support the diffusion plate, the air layer having the same thickness as the adhesive layers and being located between an adjacent pair of the adhesive layers.

18. The display device according to claim 17, wherein the support member have a flange that contacts the reflective portion of the optical member to support the optical member.

19. A surface light source comprising:

at least one light source;

a diffusion plate disposed opposite the at least one light source and having an emission surface that faces away from the at least one light source, the diffusion plate diffusing light from the at least one light source to emit the light from the at least one light source from the emission surface;

an optical member disposed between the diffusion plate and the at least one light source and having at least one transmitting portion that transmits the light from the light source and a reflective portion that reflects the light from the at least one light source, the at least one transmitting portion including a plurality of through holes; and a plurality of adhesive layers bonding the optical member and the diffusion plate with an air layer therebetween, the adhesive layers being arranged spaced apart from each other in a direction in which the optical member extends, the air layer having the same thickness as the adhesive layers and being located between an adjacent pair of the adhesive layers, and the adhesive layers being arranged to at least partially overlap with the through holes as viewed in a direction perpendicular to the emission surface of the diffusion plate.

* * * * *